United States Patent
Shim et al.

(10) Patent No.: US 9,122,585 B2
(45) Date of Patent: Sep. 1, 2015

(54) METHOD FOR MANAGING DATA IN STORAGE DEVICE AND MEMORY SYSTEM EMPLOYING SUCH A METHOD

(71) Applicant: SAMSUNG ELECTRONICS CO., LTD., Suwon-Si, Gyeonggi-Do (KR)

(72) Inventors: Gyu-Dong Shim, Hwaseong-si (KR); Won-Moon Cheon, Hwaseong-si (KR); Jae-Hoon Heo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 327 days.

(21) Appl. No.: 13/684,263

(22) Filed: Nov. 23, 2012

(65) Prior Publication Data

US 2013/0173854 A1    Jul. 4, 2013

(30) Foreign Application Priority Data

Jan. 2, 2012    (KR) ........................ 10-2012-0000237

(51) Int. Cl.
*G06F 12/02* (2006.01)
*G06F 3/06* (2006.01)
*G06F 17/30* (2006.01)

(52) U.S. Cl.
CPC ............ *G06F 12/0246* (2013.01); *G06F 3/061* (2013.01); *G06F 3/064* (2013.01); *G06F 17/30368* (2013.01); *G06F 17/30371* (2013.01); *G06F 2212/7202* (2013.01); *Y02B 60/1225* (2013.01)

(58) Field of Classification Search
None
See application file for complete search history.

(56) References Cited

U.S. PATENT DOCUMENTS

| 7,509,471 | B2 | 3/2009 | Gorobets |
| 2010/0191922 | A1 | 7/2010 | Dickey et al. |
| 2011/0252210 | A1* | 10/2011 | Davies ........................ 711/165 |

FOREIGN PATENT DOCUMENTS

KR    1020090090570 A    8/2009

OTHER PUBLICATIONS

Mei-Ling Chiang et al., "Data Management in a Flash Memory Based Storage Server".

* cited by examiner

*Primary Examiner* — Midys Rojas
(74) *Attorney, Agent, or Firm* — Volentine & Whitt, PLLC

(57) ABSTRACT

A method for managing data in a storage device includes: receiving a logical page from a host and calculating an actual time stamp of the logical page; finding a block of the storage device in which the logical page is stored and detecting a time stamp of the block and a page offset of the logical page stored in the block; calculating an approximate time stamp of the logical page stored in the block using the time stamp of the block and the page offset; and determining that the logical page is in a first state if the difference between the actual time stamp and the approximate time stamp is smaller than a threshold value, and determining that the logical page is in a second state different from the first state if the difference between the actual time stamp and the approximate time stamp is larger than the threshold value.

15 Claims, 13 Drawing Sheets

FIG. 1
B1
[FREE BLOCK]
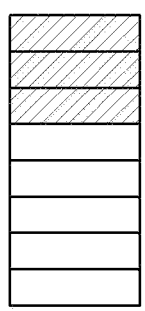 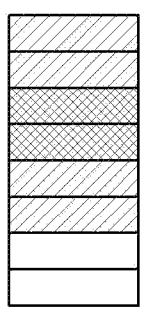
B2     B3
[OPEN BLOCK]
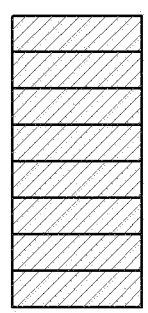 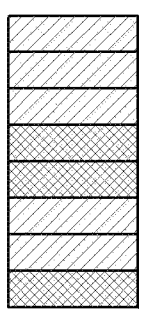
B4     B5
[FULL BLOCK]
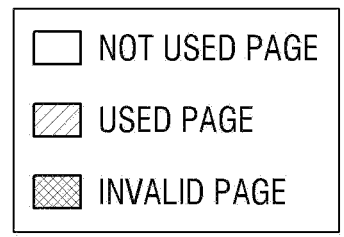

FIG. 4

BLOCK

| PAGE 0 | t0 |
|---|---|
| PAGE 1 | t1 |
| PAGE 2 | t2 |
| PAGE 3 | t3 |
| PAGE 4 | t4 |
| PAGE 5 | t5 |
| PAGE 6 | t6 |
| PAGE 7 | t7 |
| PAGE 8 | t8 |
| PAGE 9 | t9 |
| PAGE 10 | t10 |
| PAGE 11 | t11 |
| PAGE 12 | t12 |
| PAGE 13 | t13 |
| PAGE 14 | t14 |
| PAGE 15 | t15 |

FIG. 5

BLOCK

| | |
|---|---|
| PAGE 0 | t0 |
| PAGE 1 | |
| PAGE 2 | |
| PAGE 3 | |
| PAGE 4 | |
| PAGE 5 | |
| PAGE 6 | |
| PAGE 7 | |
| PAGE 8 | |
| PAGE 9 | |
| PAGE 10 | |
| PAGE 11 | |
| PAGE 12 | |
| PAGE 13 | |
| PAGE 14 | |
| PAGE 15 | |

FIG. 7

BLOCK

| | |
|---|---|
| PAGE 0 | t0 |
| PAGE 1 | |
| PAGE 2 | |
| PAGE 3 | |
| PAGE 4 | |
| PAGE 5 | |
| PAGE 6 | |
| PAGE 7 | |
| PAGE 8 | t1 |
| PAGE 9 | |
| PAGE 10 | |
| PAGE 11 | |
| PAGE 12 | |
| PAGE 13 | |
| PAGE 14 | |
| PAGE 15 | |

FIG. 9
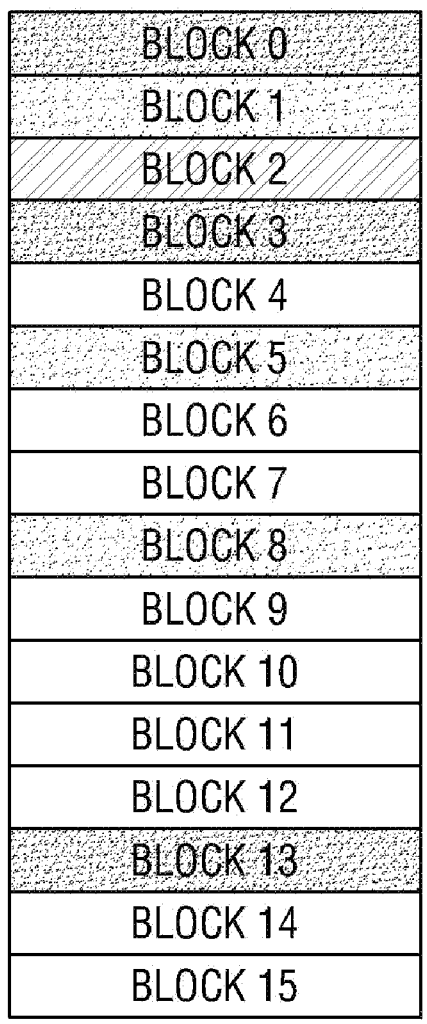
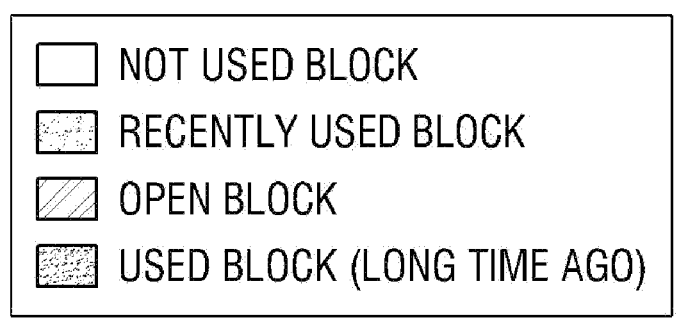

METHOD FOR MANAGING DATA IN STORAGE DEVICE AND MEMORY SYSTEM EMPLOYING SUCH A METHOD

CROSS-REFERENCE TO RELATED APPLICATION

This application claims priority from Korean Patent Application No. 10-2012-0000237 filed on Jan. 2, 2012 in the Korean Intellectual Property Office, and all the benefits accruing therefrom under 35 U.S.C. 119, the contents of which in its entirety are herein incorporated by reference.

BACKGROUND

The present inventive concept relates to a method for managing data in a storage device.

Generally, a non-volatile memory device is widely used as a storage medium for storing and processing data in an embedded system such as a household appliance, a communication device, a set-top box, etc.

The non-volatile memory device has both an advantage of a random access memory (RAM) that the data can be freely written or erased, and an advantage of a read only memory (ROM) that the data stored can be retained even without a supply of power.

Further, a flash memory device that is widely used among non-volatile memory devices is a non-volatile memory element which can electrically erase or rewrite data. The flash memory device is suitable for a mobile apparatus or the like because it has a small size, has a fast access time like a hard disk, and has low power consumption compared to a storage medium based on a magnetic disk memory.

In such a non-volatile memory device, if the data is updated, the existing page on which the data has been written remains invalid, and a new page is allocated such that data to be updated is written on the new page. In this case, if the available space in insufficient in the non-volatile memory device, garbage collection for collecting only valid pages is performed to increase the available space.

Meanwhile, the time required for performing the garbage collection may serve as a load factor reducing the performance of the non-volatile memory device. Thus, the shorter the time required for performing the garbage collection during the operation of the non-volatile memory device, the better the entire performance of the device.

SUMMARY

The present invention provides a method for managing data in a storage device capable of reducing the time required for garbage collection.

The objects of the present invention are not limited thereto, and the other objects of the present invention will be described in or be apparent from the following description of the embodiments.

According to an aspect of the present invention, there is provided a method for managing data in a storage device. The method comprises: receiving a logical page from a host and calculating an actual time stamp of the logical page; finding a block of the storage device in which the logical page is stored and detecting a time stamp of the block and a page offset of the logical page stored in the block; calculating an approximate time stamp of the logical page stored in the block by using the time stamp of the block and the page offset; and determining that the logical page is in a first state if a difference between the actual time stamp and the approximate time stamp is smaller than a threshold value, and determining that the logical page is in a second state different from the first state if the difference between the actual time stamp and the approximate time stamp is larger than the threshold value.

According to another aspect of the present invention, there is provided a method for managing data in a storage device. The method comprises: receiving a logical page from a host and detecting a block of the storage device in which the logical page is stored; and determining that the logical page is in a first state if the detected block is a block included in a recently used block list, and determining that the logical page is in a second state different from the first state if the detected block is a block not included in the recently used block list.

According to yet another aspect of the present invention, a memory system, comprises: a nonvolatile memory device comprising a plurality of memory blocks, each of which memory blocks includes a plurality of logical pages; and a controller connected to the nonvolatile memory device, wherein the controller is configured to access the nonvolatile memory device in response to a request from a host, wherein the memory system is configured to receive a logical page from the host and in response thereto to determine whether the received logical page is in a first state or in a second state different from the first state, wherein when the logical page is in the first state this indicates that the logical page is more frequently updated than when the logical page is in the second state.

BRIEF DESCRIPTION OF THE DRAWINGS

The above and other aspects and features of the present invention will become more apparent by describing in detail exemplary embodiments thereof with reference to the attached drawings, in which:

FIG. 1 illustrates the types of blocks included in a storage device in accordance with the embodiments of the present invention;

FIG. 4 illustrates a block in which a time stamp is stored for each page;

FIG. 5 illustrates a block storing one time stamp therein;

FIG. 7 illustrates a block storing two time stamps therein;

FIG. 9 illustrates a use state of each of a number of blocks included in the storage device;

DETAILED DESCRIPTION OF THE EMBODIMENTS

Figure 2:
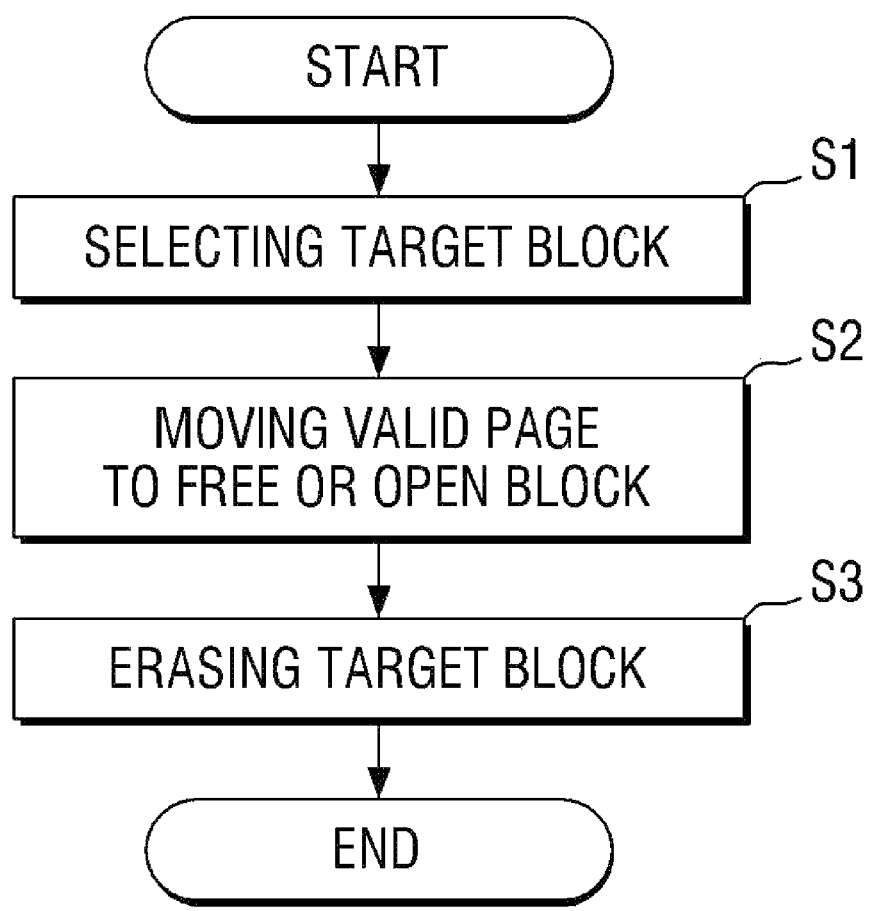
FIG. 2 is a flowchart showing a process of performing general garbage collection.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Prior to the detailed description of embodiments of the present invention, first, the terms used herein will be defined with reference to FIG. 1.

FIG. 1 illustrates the types of blocks included in a storage device in accordance with the embodiments of the present invention.

Referring to FIG. 1, the storage device in accordance with the embodiments of the present invention may include various types of blocks. In this embodiment, the types of the blocks, as illustrated, include a free block, an open block, a full block, and the like.

Hereinafter, a case where a non-volatile memory device (more specifically, flash memory device) is used as an example of the storage device in accordance with the embodiments of the present invention will be described, but the storage device of the present invention is not limited thereto.

A free block means a block (i.e., block B1) including no logical page as shown in FIG. 1. The number of free blocks which are present is largest when the non-volatile memory device is driven for the first time, and the number of free blocks gradually decreases as the use time of the device increases. Further, when the number of free blocks in the device is equal to or less than a predetermined value due to a further increase of the use time of the device, the non-volatile memory device generates new free blocks through garbage collection or the like.

Although a case where one block B1 included in the non-volatile memory device stores up to eight logical pages has been illustrated in FIG. 1, the present invention is not limited thereto. If necessary, the number of the logical pages included in one block B1 may be larger or smaller than eight.

An open block means, as shown in FIG. 1, a block (i.e., block B2, B3) which stores a predetermined number of logical pages, the number of the logical pages being less than the maximum number (e.g., eight) of logical pages that can be included in the block. For example, each of the second block B2 and the third block B3 may store up to eight logical pages, but only three logical pages are stored in the second block B2 and only six logical pages are stored in the third block B3.

When a logical page is inputted to the non-volatile memory device from a host, the input logical page is generally stored in the open block B2 or B3. Meanwhile, if the logical page that is already stored in the block is updated by the host, the existing logical page stored in the block is invalidated. In other words, if the same logical page is inputted again from the host, the existing logical page stored in the block B3 is changed to an invalid logical page, and a newly input logical page is stored in a new block (e.g., free block or another open block). That is, invalid pages of the third block B3 of FIG. 1 are logical pages already stored in the third block B3 which have been updated by the host.

A full block means, as shown in FIG. 1, a block (i.e., block B4, B5) storing the maximum number (e.g., eight) of logical pages that can be included in the block. In FIG. 1, a full block may mean a block storing eight logical pages therein. Even in the logical pages stored in the full block, a logical page updated by the host is changed to an invalid page. In a fifth block B5, three pages have been changed to invalid pages by page update after the fifth block B5 becomes a full block.

Next, a process of performing general garbage collection will be described with reference to FIG. 2.

FIG. 2 is a flowchart showing a process of performing general garbage collection.

Referring to FIG. 2, first, a target block is selected (step S1). In the process of performing general garbage collection, the target block may be selected among the full blocks.

Then, valid pages stored in the target block are moved to a free block or open block (step S2).

Subsequently, all of the valid pages stored in the target block are erased and the target block is returned as a free block (step S3).

In the process of performing general garbage collection, in step S1, a full block including the fewest valid pages may be selected as a target block. In other words, step S1 may be performed by using an invalid page count (IPC) method in which the number of invalid pages included in each full block is counted and a full block including the most invalid pages is selected as a target block. The reason for selecting such a full block as a target block is that the amount of valid pages that are required to be moved in step S2 becomes the smallest. In this way, if the amount of valid pages that are required to be moved in step S2 becomes the smallest, the overhead may be reduced in the entire process of performing garbage collection. Thus, a reduction in performance of the non-volatile memory device caused by performing garbage collection may be the smallest.

Next, hot-cold page separation will be described with reference to FIG. 3.

Figure 3:
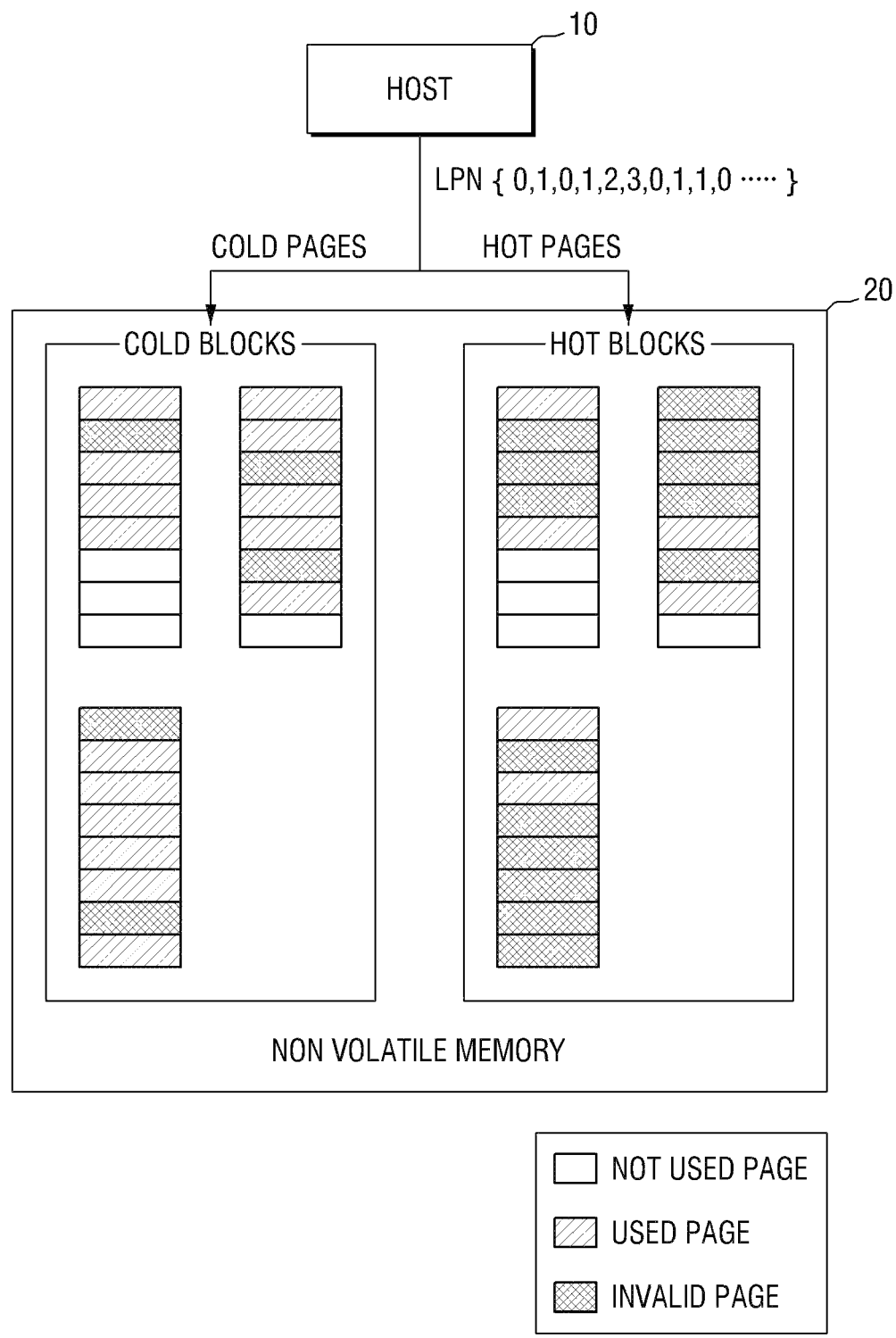
FIG. 3 is a diagram for explaining a concept of hot-cold page separation.

FIG. 3 is a diagram for explaining the concept of the hot-cold page separation.

First, as shown in FIG. 3, let us suppose that logical pages 0, 1, 0, 1, 2, 3, 0, 1, 1, 0 are sequentially inputted to a non-volatile memory device 20 from a host 10. In this case, a non-volatile memory device 20 may include four free blocks B1 to B4.

The hot-cold page separation means that among the logical pages inputted from host 10, a hot page is stored in hot blocks of non-volatile memory device 20 and a cold page is stored in cold blocks of non-volatile memory device 20.

Here, a hot page means a page that is frequently updated by host 10, and a cold page means a page that is not frequently updated by host 10. In the example of FIG. 3, logical pages 0 and 1 may be hot pages and logical pages 2 and 3 may be cold pages.

In this way, in a case where the logical pages received from host 10 are classified into hot and cold pages to be stored in different blocks of non-volatile memory device 20, the hot blocks include more invalid pages because page updates frequently occur, and the cold blocks include less invalid pages because page updates do not frequently occur Thus, it can be seen that if a full block included in the hot blocks is selected as the target block of the garbage collection, it takes less time to move effective pages included in the target block. In other words, it can be seen that if it is determined in advance whether the logical page inputted from host 10 is a hot page or cold page to manage data, then it is possible to reduce the time required for the garbage collection.

As described above, whether the logical page inputted from host 10 is a hot page or cold page may be determined by various methods. One of these methods will be described with reference to FIG. 4.

FIG. 4 illustrates a block in which a time stamp is stored for each page.

A block capable of storing up to sixteen pages is illustrated in FIG. 4. Further, the block stores a time stamp for each page. For example, t0 means a time stamp when page 0 is written in the block, and t11 means a time stamp when page 11 is written in the block.

Here, the time stamp may mean, e.g., a sequence number of the page being provided to the storage device including the block from the host. In the example of FIG. 3, a sequence number of logical page 0 (LPN 0) inputted first is 1, and a sequence number of logical page 1 (LPN 1) inputted first is 2. In this way, if the block stores the time stamp for each page, it is possible to determine whether the logical page inputted from the host is a hot page or cold page.

A more specific description thereof will be provided below.

Suppose that logical page 0 (LPN 0) is stored in PAGE 0 of FIG. 4 and logical page 1 (LPN 1) is stored in PAGE 1 of FIG. 4. Then, t0 is 1 and t1 is 2.

Meanwhile, a sequence number of logical page 0 (LPN 0) inputted again in FIG. 3 is 3. However, logical page 0 is already stored in PAGE 0, and time stamp t0 when logical page 0 is stored in PAGE 0 is 1. If it is determined that a logical page in which the time until the logical page is updated is equal to or less than 4 is classified as a hot page, since the time until logical page 0 (LPN 0) is updated is 2, logical page 0 (LPN 0) is classified as a hot page.

Based on the above, when classifying logical pages 1, 2 and 3 (LPN 1~3), logical page 1 (LPN 1) may be classified as a hot page, and logical pages 2 and 3 (LPN 2, 3) may be classified as cold pages.

However, in the case that the block stores the time stamp for each page as shown in FIG. 4, a large portion of a storage area of the non-volatile memory device should be used to store the time stamp for each page. Thus, it may be inefficient in effectively utilizing the storage area of the non-volatile memory device. Various methods may be considered to overcome the drawback. Hereinafter, one of these methods will be described with reference to FIG. 5.

FIG. 5 illustrates a block storing one time stamp therein.

Referring to FIG. 5, the block of FIG. 5 stores one time stamp t0 unlike the block illustrated in FIG. 4. In this embodiment, one time stamp t0 stored in the block may be defined as a time stamp of the block. That is, the time stamp of the block may be a time stamp when a first logical page (i.e., logical page being written in PAGE 0) is stored in the block. Thus, in the case that only one time stamp is stored in the block, since the size of the storage area required for storing the time stamp is reduced, it is possible to efficiently use the storage area of the non-volatile memory device.

Now, how to determine whether the logical page inputted from the host is a hot page or cold page will be described for an arrangement such as the arrangement shown in FIG. 5 where the block only stores one time stamp therein.

Figure 6:
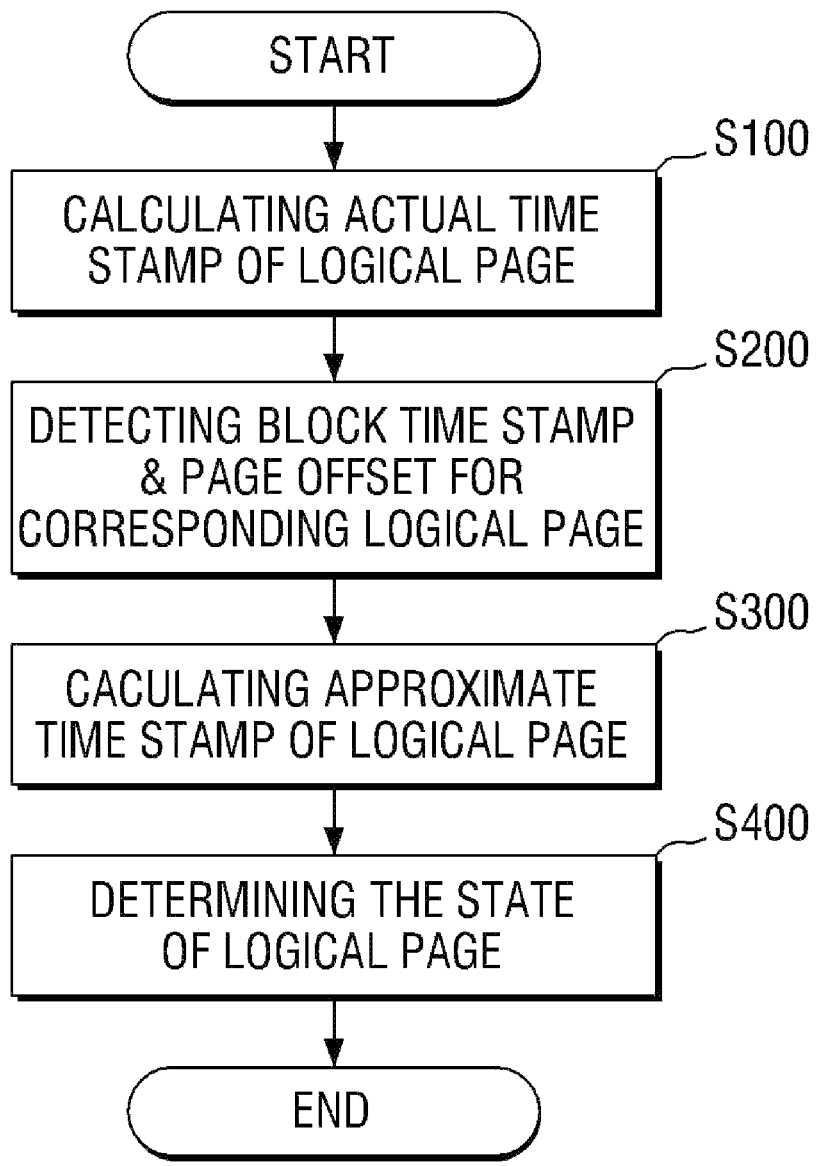
FIG. 6 is a flowchart for explaining a method for managing data in a storage device in accordance with an embodiment of the present invention.

FIG. 6 is a flowchart for explaining a method for managing data in a storage device in accordance with an embodiment of the present invention.

Referring to FIG. 6, first, a logical page is received from the host, and an actual time stamp of the logical page is calculated (step S100). Here, the actual time stamp of the logical page received from the host means an actual sequence number of the logical page received from the host.

In the example of FIG. 3, since the sequence number of the first logical page 0 (LPN 0) input to non-volatile memory device 20 is 1, when the first logical page 0 (LPN 0) is inputted to non-volatile memory device 20 from host 10, the actual time stamp of the first logical page 0 (LPN 0) is 1. Further, since the sequence number of the second logical page 0 (LPN 0) input to non-volatile memory device 20 is 3, when the second logical page 0 (LPN 0) is inputted to non-volatile memory device 20 from host 10, the actual time stamp of the second logical page 0 (LPN 0) is 3.

Then, after finding a block of the storage device in which the logical page is stored, the time stamp of the block and a page offset of the logical page stored in the block are detected (step S200).

Let us suppose that the first logical page 0 (LPN 0) input to non-volatile memory device 20 has been stored in PAGE 0 of the block shown in FIG. 5. In this case, since time stamp t0 of the block is a time stamp when logical page 0 (LPN 0) is stored in PAGE 0 of the block, time stamp t0 of the block is 1.

Also, let us suppose that the second logical page 0 (LPN 0) has been input from host 10. In this case, the block storing logical page 0 (LPN 0) is the block shown in FIG. 5, and, at this time, the time stamp of the block shown in FIG. 5 is 1. Meanwhile, since logical page 0 (LPN 0) is stored in PAGE 0 of the block, the page offset of logical page 0 (LPN 0) is 0.

Then, an approximate time stamp of the logical page stored in the block is calculated by using the time stamp of the block and the page offset (step S300).

In this case, the approximate time stamp of the logical page stored in the block can be calculated by the following Eq. 1:

$$\text{Approximate time stamp} = \text{Time stamp of block} + \text{Page offset of logical page} * k \quad \text{Eq. 1,}$$

where k≥0 and k is a real number.

In the above example, since the time stamp of the block is 1 and the page offset of the logical page is 0, the approximate time stamp is 1.

Then, a state of the logical page is determined considering the actual time stamp and the approximate time stamp (step S400).

Specifically, if a difference between the actual time stamp and the approximate time stamp is smaller than a set critical value, or threshold value, it is determined that the logical page is a logical page in a first state (e.g., hot page). Further, if a difference between the actual time stamp and the approximate time stamp is larger than the set critical value (threshold value), it is determined that the logical page is a logical page in a second state different from the first state (e.g., cold page).

In the above example, when the second logical page 0 (LPN 0) of FIG. 3 is provided to non-volatile memory device 20, since the actual time stamp is 3 and the previously calculated approximate time stamp is 1, a difference between them is 2. By determining whether the difference is larger or smaller than the critical value (e.g., 4) set by a user, it is possible to determine whether the second logical page 0 (LPN 0) of FIG. 3 is a hot page or cold page.

In the same way, we now consider whether the second logical page 1 (LPN 1) inputted to non-volatile memory device 20 in FIG. 3 is a hot page or cold page.

First, the actual time stamp of the second logical page 1 (LPN 1) inputted to non-volatile memory device 20 is 4.

Then, if the first logical pages 0 and 1 (LPN 0, 1) inputted to non-volatile memory device 20 in FIG. 3 have been sequentially stored in the block shown in FIG. 5, logical page 0 (LPN 0) would have been stored in PAGE 0 of the block, and logical page 1 (LPN 1) would have been stored in PAGE 1 of the block. Accordingly, the block storing logical page 1 (LPN 1) when the second logical page 1 (LPN 1) is inputted to non-volatile memory device 20 is the block shown in FIG. 5. At this time, since the time stamp of the block is 1 (t0) and logical page 1 (LPN 1) is stored in PAGE 1, the page offset of logical page 1 (LPN 1) is 1.

Based on such results, when calculating the approximate time stamp of logical page 1 (LPN 1) using Eq. 1, it can be seen that the approximate time stamp of logical page 1 (LPN 1) is 1+k.

Then, since the previously calculated actual time stamp is 4 and the approximate time stamp is 1+k, if 4−(1+k) is smaller than the critical value set by the user, it may be determined that the second logical page 1 (LPN 1) inputted to non-volatile memory device 20 of FIG. 3 is a hot page. On the other hand, if 4−(1+k) is larger than the critical value, it may be determined that the second logical page 1 (LPN 1) inputted to non-volatile memory device 20 of FIG. 3 is a cold page.

Meanwhile, in some embodiments of the present invention, other methods may be used to more precisely calculate the approximate time stamp of the logical page.

FIG. 7 illustrates a block storing two time stamps therein.

Referring to FIG. 7, unlike the example of FIG. 5, in the example illustrated in FIG. 7 one block stores two time stamps t0 and t1. In this case, the first time stamp t0 may be a time stamp when PAGE 0 of the block is used in the same way as described above, and the second time stamp t1 may be a time stamp when PAGE 8 of the block is used. Thus, in this embodiment, one block stores two time stamps t0 and t1, thereby more precisely calculating the approximate time stamp of the logical page. Hereinafter, how to determine whether the logical page inputted from the host is a hot page or cold page using this method will be described.

Figure 8:
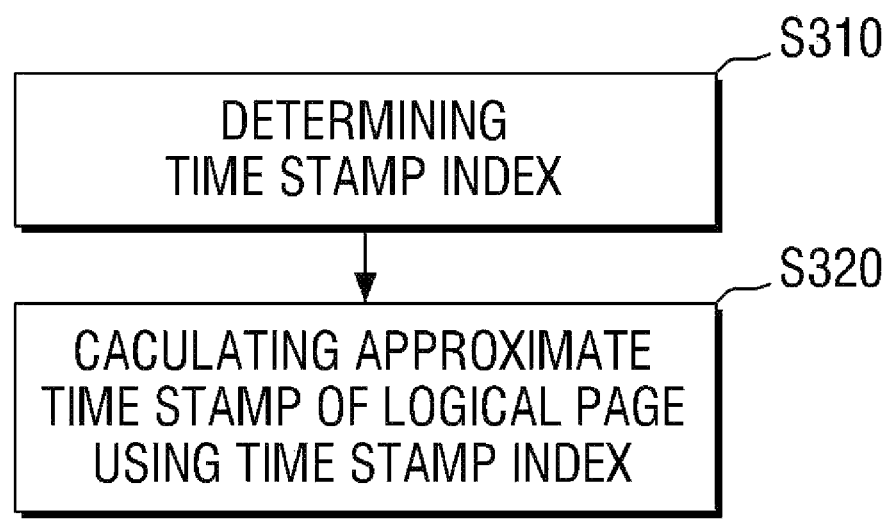
FIG. 8 is a flowchart for explaining a method for managing data in a storage device in accordance with another embodiment of the present invention.

FIG. 8 is a flowchart for explaining a method for managing data in a storage device in accordance with another embodiment of the present invention.

This embodiment includes, in the same way as in the above embodiment, receiving a logical page from the host and calculating the actual time stamp of the logical page (step S100 of FIG. 6), after finding a block of the storage device in which the logical page is stored, detecting the time stamp of the block and the page offset of the logical page stored in the block (step S200 of FIG. 6), and determining the state of the logical page considering the actual time stamp and the approximate time stamp (step S400 of FIG. 6). Thus, a difference in calculating the approximate time stamp of the logical page stored in the block by using the time stamp of the block and the page offset (step 300 of FIG. 6) between the above embodiment and this embodiment will be described in detail.

Referring to FIG. 8, first, a time stamp index of the block is determined (step S310). Here, the time stamp index may be used to determine which one of two time stamps t0 and t1 (see FIG. 7) stored in the block will be used to calculate the approximate time stamp afterwards.

Specifically, the time stamp index may be determined by the following Eq. 2:

Time stamp index=[Page offset*2/Maximum number of logical pages that can be stored in block]   Eq. 2, where [α] is the largest integer smaller than α.

That is, if the logical pages inputted from the host are stored in PAGE 0~7 of FIG. 7, the time stamp index is 0, and if the logical pages inputted from the host are stored in PAGE 8~15 of FIG. 7, the time stamp index is 1.

Then, the approximate time stamp is calculated using the time stamp of the block, the time stamp index of the block and the page offset (step S320).

Specifically, the approximate time stamp may be determined by the following Eq. 3:

Approximate time stamp=Time stamp of block in consideration of time stamp index+((Page offset of logical page)%(Maximum number of logical pages that can be stored in block/2))*k   Eq. 3, where (b) % (c) is a remainder when b is divided by c, k≥0, and where k is a real number.

In the above-described example, if the logical pages inputted from the host are stored in PAGE 0~7 of FIG. 7, since the time stamp index is 0, the first time stamp t0 (see FIG. 7) of the block is the time stamp of the block in consideration of the time stamp index in the above Eq. 3. Meanwhile, if the logical pages inputted from the host are stored in PAGE 8~15 of FIG. 7, since the time stamp index is 1, the second time stamp t1 (see FIG. 7) of the block is the time stamp of the block in consideration of the time stamp index in the above Eq. 3.

Thus, when the approximate time stamp is calculated using Eq. 3, it is possible to calculate the approximate time stamp of the logical page by using both of the two time stamps stored in the block unlike the above-described embodiment, thereby more precisely calculating the approximate time stamp of the logical page.

Meanwhile, in some other embodiments of the present invention, the number of time stamps (e.g., time stamps t0, t1 of FIG. 7) that can be stored in one block may be greater than that of the above example. In other words, n time stamps (n is smaller than the number of the logical pages stored in the block) may be stored in one block.

In this case, the above Eq. 2 can be modified into the following Eq. 4:

Time stamp index=[Page offset*n/Maximum number of logical pages that can be stored in block]   Eq. 4, where [α] is the largest integer smaller than α.

Further, the above Eq. 3 can be modified into the following Eq. 5:

Approximate time stamp=Time stamp of block in consideration of time stamp index+((Page offset of logical page)%(Maximum number of logical pages that can be stored in block/n))*k   Eq. 5, where (b) % (c) is a remainder when b is divided by c, and where k≥0 and k is a real number.

In case of increasing the number of the time stamps (t0, t1 of FIG. 7) being stored in one block, there is an advantage of more precisely calculating the approximate time stamp of a logical page, but it may be required to use a larger portion of the storage area of the non-volatile memory device in order to store these time stamps. Accordingly, by appropriately adjusting the number of the time stamps (t0, t1 of FIG. 7) being stored in one block according to the environment in which the non-volatile memory device is used, it is possible to reduce the time required for the garbage collection while improving the performance of the non-volatile memory device.

Meanwhile, whether a logical page inputted from the host is a hot page or cold page may be determined by using a method different from the above-described method.

Figure 10:
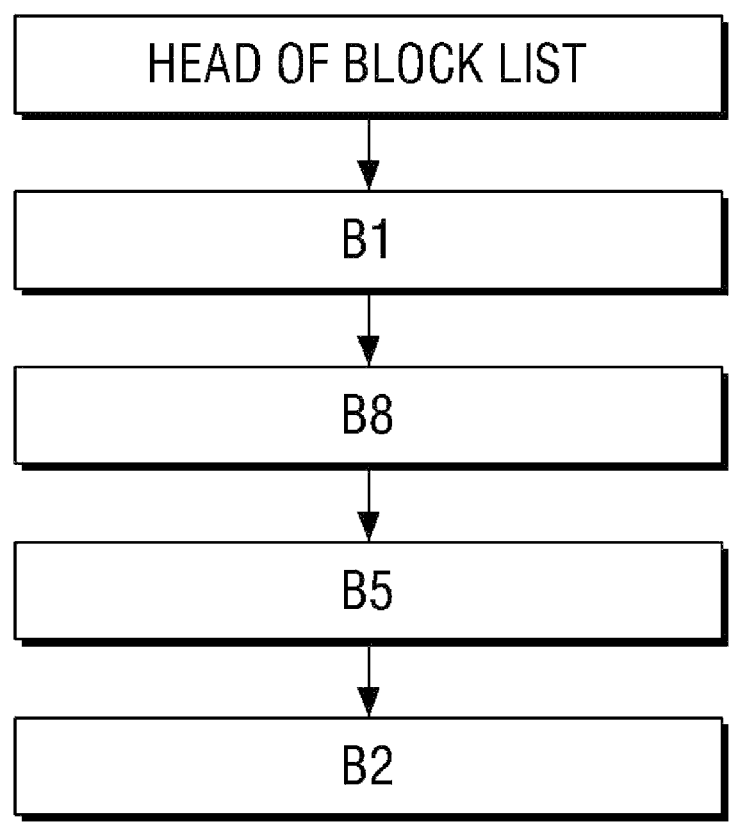
FIG. 10 illustrates a recently used block list in accordance with an embodiment of the present invention.

FIG. 9 illustrates the use state of each of a number of blocks included in a storage device. FIG. 10 illustrates a recently used block list in accordance with an embodiment of the present invention.

Referring to FIG. 9, a number of blocks in different use states may be included in the non-volatile memory device. For example, blocks 4, 6, 7, 9, 10, 11, 12, 14, 15 may be free blocks, each storing no logical page, and block 2 may be an open block. Further, blocks 0, 3, 13 may be blocks in each of which a considerable amount of time has elapsed since the logical page stored therein was last updated by the host. Further, blocks 1, 5, 8 may be blocks, in each of which the logical page stored therein has been recently updated by the host.

Here, if there is a list of blocks in each of which the logical page stored therein is updated by the host, then it is possible to determine whether the logical page inputted from the host is a hot page or cold page.

For example, if the logical page stored in block 2, the logical page stored in block 5, the logical page stored in block 8 and the logical page stored in block 1 have been sequentially updated by the host, the recently used block list may be configured as shown in FIG. 10. In this case, the number of blocks included in the recently used block list may be set by the user.

Hereinafter, how to determine whether the logical page inputted from the host is a hot page or cold page using the recently used block list will be described with reference to FIG. 11.

Figure 11:
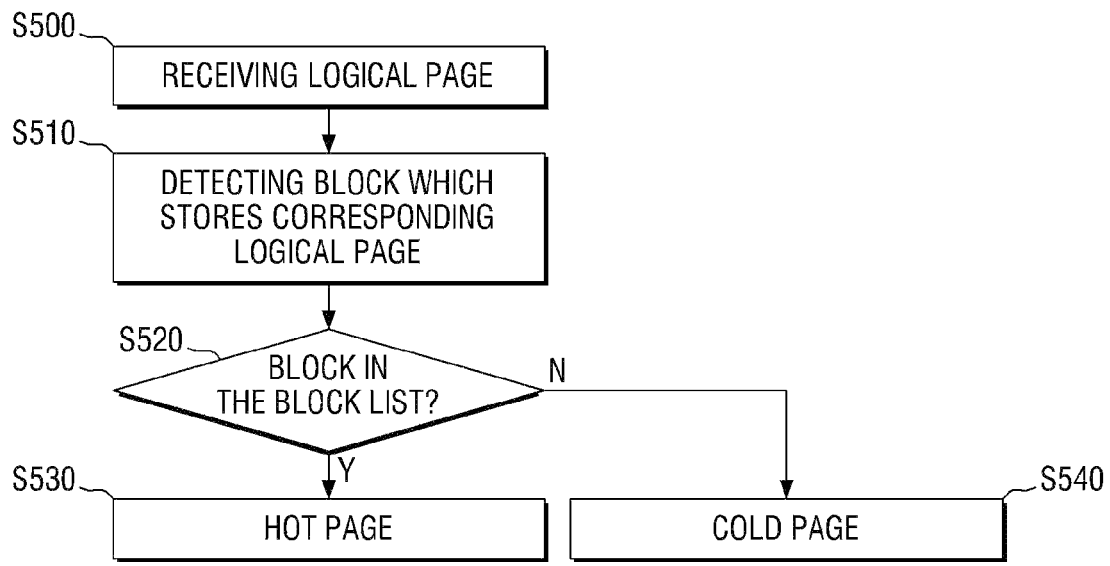
FIG. 11 is a flowchart for explaining a method for managing data in a storage device in accordance with still another embodiment of the present invention.

FIG. 11 is a flowchart for explaining a method for managing data in a storage device in accordance with still another embodiment of the present invention.

Referring to FIG. 11, first, a logical page is received from the host (step S500).

Further, the block of the storage device (e.g., non-volatile memory device) storing the received logical page is detected (step S510). In this case, the detected block may be an open block or a full block.

Then, the detected block is compared with the recently used block list to determine the state of the logical page received from the host (step S520).

Specifically, if the detected block is a block included in the recently used block list (FIG. 10), it may be determined that the logical page received from the host is a logical page) in a first state (e.g., hot page. If the detected block is a block not included in the recently used block list (FIG. 10), it may be determined that the logical page received from the host is a logical page in a second state (e.g., cold page) different from the first state.

Hereinafter, a memory system in accordance with some embodiments of the present invention and application examples thereof will be described with reference to FIGS. 12 to 14.

Figure 12:
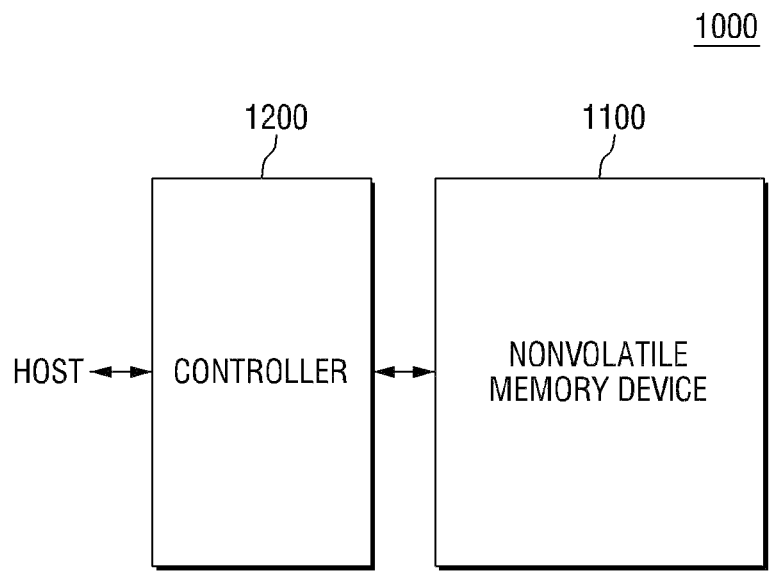
FIG. 12 is a block diagram for explaining a memory system in accordance with some embodiments of the present invention.

FIG. 12 is a block diagram for explaining a memory system in accordance with some embodiments of the present invention. FIG. 13 is a block diagram showing an application example of the memory system of FIG. 12. FIG. 14 is a block diagram showing a computing system including the memory system described with reference to FIG. 13.

Referring to FIG. 12, a memory system 1000 includes a nonvolatile memory device 1100 and a controller 1200.

Nonvolatile memory device 1100 may be a non-volatile memory device performing data management in accordance with the above-described embodiments.

Controller 1200 is connected to a host and nonvolatile memory device 1100. In response to the request of the host, controller 1200 is configured to access nonvolatile memory device 1100. For example, controller 1200 is configured to control the read, write, erase and background operations of nonvolatile memory device 1100. Controller 1200 is configured to provide an interface between nonvolatile memory device 1100 and the host. Controller 1200 is configured to operate firmware for controlling nonvolatile memory device 1100.

Specifically, controller 1200 may further include well-known components such as a random access memory (RAM), a processing unit, a host interface, and a memory interface. The RAM is used as at least one of an operation memory of the processing unit, a cache memory between nonvolatile memory device 1100 and the host, and a buffer memory between nonvolatile memory device 1100 and the host. The processing unit controls all operations of controller 1200.

The host interface includes a protocol for performing data exchange between the hose and controller 1200. For example, controller 1200 is configured to perform communication with the outside (host) through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol. The memory interface interfaces with nonvolatile memory device 1100. For example, the memory interface includes a NAND interface or NOR interface.

Memory system 1000 may be configured to additionally include an error correction block. The error correction block is configured to detect and correct an error of data read from nonvolatile memory device 1100 using an error correction code (ECC). As an example, the error correction block is provided as a component of controller 1200. The error correction block may be provided as a component of nonvolatile memory device 1100.

Controller 1200 and nonvolatile memory device 1100 may be integrated as one semiconductor device. Specifically, controller 1200 and nonvolatile memory device 1100 may be integrated as one semiconductor device to constitute a memory card. For example, controller 1200 and nonvolatile memory device 1100 may be integrated as one semiconductor device to constitute a memory card such as a PC card (personal computer memory card international association (PC-MCIA)), a compact flash card (CF), a smart media card (SM, SMC), a memory stick, a multimedia card (MMC, RS-MMC, MMCmicro), a SD card (SD, miniSD, microSD, SDHC), a universal flash storage device (UFS) and the like.

Controller 1200 and nonvolatile memory device 1100 may be integrated as one semiconductor device to constitute a semiconductor drive (solid state drive (SSD)). The semiconductor drive (SSD) includes a storage device configured to store data in a semiconductor memory. In a case where memory system 1000 is used as the semiconductor drive (SSD), an operation speed of the host connected to the memory system 1000 is dramatically improved.

As another example, memory system 1000 is provided as one of various components of an electronic apparatus such as a computer, ultra mobile PC (UMPC), workstation, net-book, personal digital assistants (PDA), portable computer, web tablet, wireless phone, mobile phone, smart phone, e-book, portable multimedia player (PMP), portable game console, navigation device, black box, digital camera, 3-dimensional television, digital audio recorder, digital audio player, digital picture recorder, digital picture player, digital video recorder, digital video player, apparatus capable of transmitting and receiving information in wireless environment, one of various electronic apparatuses constituting the home network, one of various electronic apparatuses constituting the computer network, one of various electronic apparatuses constituting the telematics network, RFID device, and one of various components forming the computing system.

Specifically, nonvolatile memory device 1100 or memory system 1000 may be mounted with various types of packages. For example, nonvolatile memory device 1100 or memory system 1000 may be mounted with a package such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flat pack (TQFP), small outline (SOIC), shrink small outline package (SSOP), thin small outline (TSOP), thin quad flat pack (TQFP), system in package (SIP), multi chip package (MCP), wafer-level fabricated package (WFP), wafer-level processed stack package (WSP).

Figure 13:
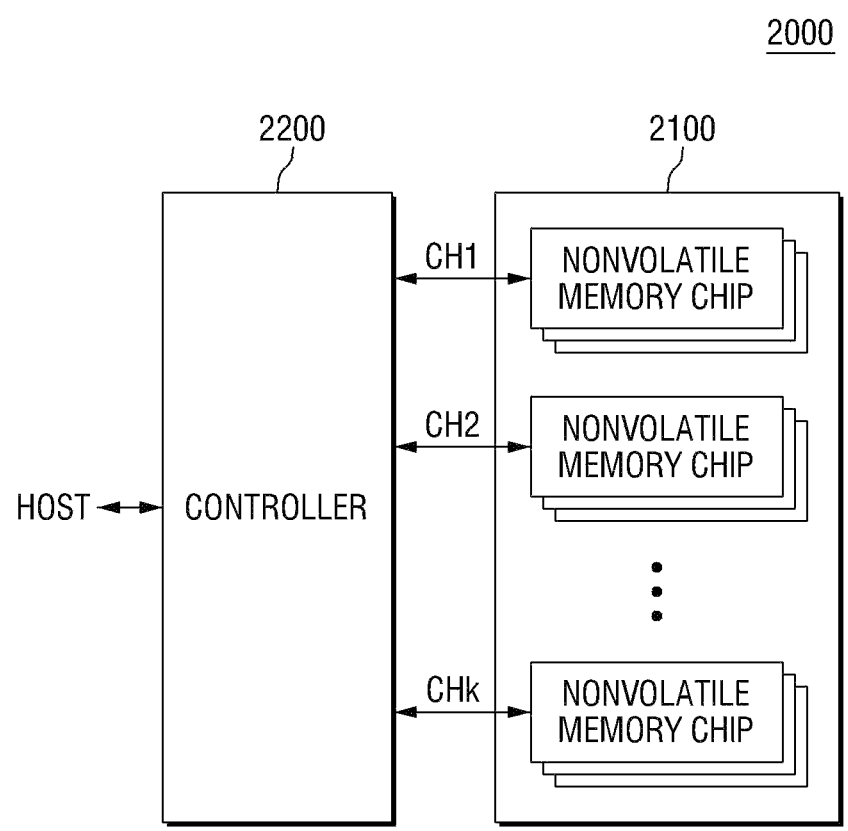
FIG. 13 is a block diagram showing an application example of the memory system of FIG. 12.

Referring to FIG. 13, a memory system 2000 includes a nonvolatile memory device 2100 and a controller 2200. Nonvolatile memory device 2100 includes a plurality of nonvolatile memory chips. The nonvolatile memory chips are classified into a plurality of groups. Each group of the nonvolatile memory chips is configured to perform communication with controller 2200 via one common channel. For example, the nonvolatile memory chips perform communication with controller 2200 via first to k-th channels CH1 to CHk.

A case where a plurality of nonvolatile memory chips are connected to one channel has been illustrated in FIG. 13. However, it can be understood that memory system 2000 may be modified such that one nonvolatile memory chip is connected to one channel.

Figure 14:
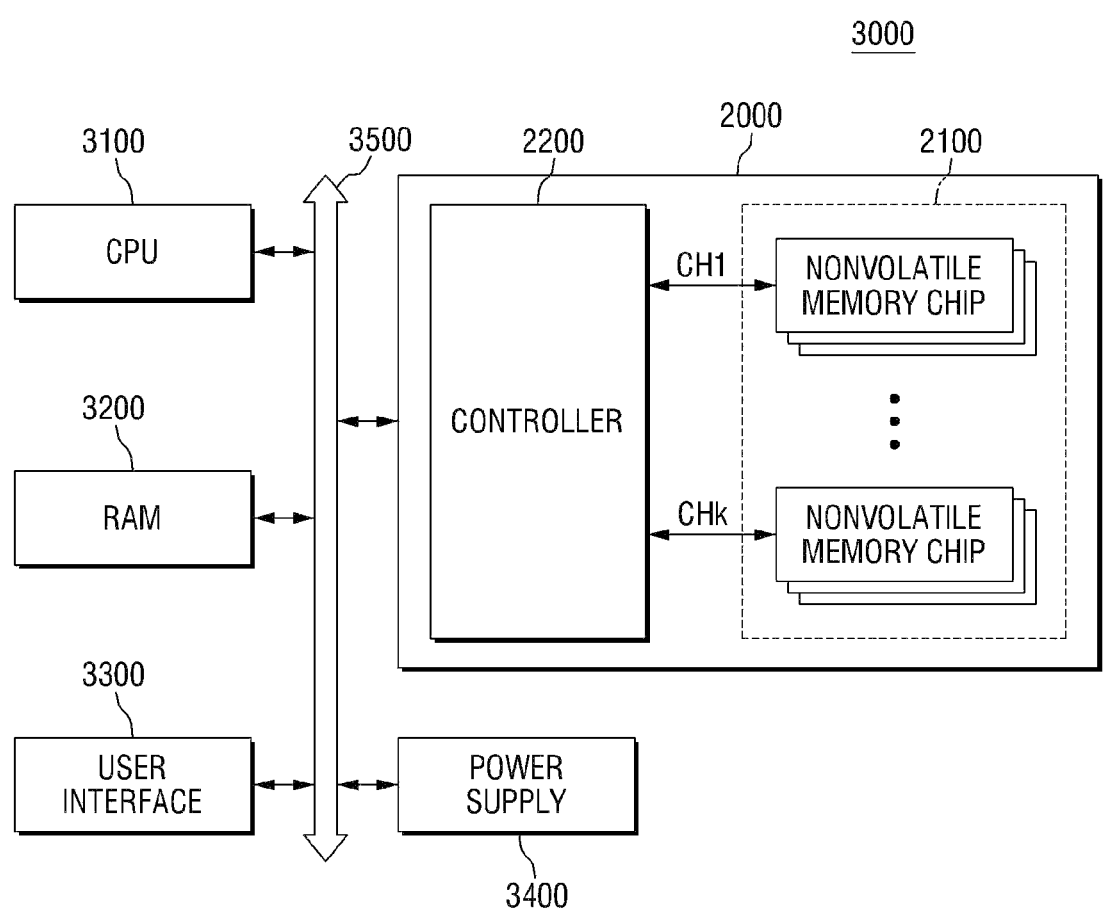
FIG. 14 is a block diagram showing a computing system including the memory system described with reference to FIG. 13.

Referring to FIG. 14, a computing system 3000 includes a central processing unit 3100, a random access memory (RAM) 3200, a user interface 3300, a power supply 3400, and memory system 2000.

Memory system 2000 is electrically connected to central processing unit 3100, RAM 3200, user interface 3300 and power supply 3400 via a system bus 3500. The data provided through user interface 3300 or processed by central processing unit 3100 is stored in memory system 2000.

FIG. 14 illustrates a case where nonvolatile memory device 2100 is connected to system bus 3500 through controller 2200. However, nonvolatile memory device 2100 may be configured to be directly connected to system bus 3500.

A case of providing memory system 2000 described with reference to FIG. 13 has been illustrated in FIG. 14. However, memory system 2000 may be replaced by memory system 1000 described with reference to FIG. 12.

For instance, computing system 3000 may be configured to include all of memory systems 1000 and 2000 described with reference to FIGS. 12 and 13.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A method for managing data in a storage device, the method comprising:
    receiving a logical page from a host and calculating an actual time stamp of the logical page;
    finding a block of the storage device in which the logical page is stored and detecting a time stamp of the block and a page offset of the logical page stored in the block;
    calculating an approximate time stamp of the logical page stored in the block by using the time stamp of the block and the page offset; and
    determining that the logical page is in a first state if a difference between the actual time stamp and the approximate time stamp is smaller than a threshold value, and determining that the logical page is in a second state different from the first state if the difference between the actual time stamp and the approximate time stamp is larger than the threshold value,
    wherein a plurality of logical pages is stored in the block, and a number of time stamps stored in the block is less than a number of the plurality of logical pages stored in the block.

2. The method of claim 1, wherein the logical page in the first state is a hot page and the logical page in the second state is a cold page.

3. The method of claim 1, wherein only one time stamp is stored in the block.

4. The method of claim 3, wherein the time stamp of the block is a time stamp when an initial logical page is stored in the block.

5. The method of claim 4, wherein the approximate time stamp is calculated by the following equation:

$$\text{Approximate time stamp} = \text{Time stamp of block} + \text{Page offset of logical page} * k,$$

where $k \geq 0$ and where k is a real number.

6. The method of claim 1, wherein more than one time stamps are stored in the block.

7. The method of claim 6, wherein said calculating an approximate time stamp comprises:
    determining a time stamp index of the block, the time stamp index identifying one of the time stamps of the block; and
    calculating the approximate time stamp by using a corresponding time stamp of the block identified by the time stamp index of the block and the page offset.

8. The method of claim 7, wherein the time stamp index of the block is determined by the following equation:

$$\text{Time stamp index} = [\text{Page offset} * n / \text{Maximum number of logical pages that can be stored in block}],$$

where n is the number of time stamps stored in the block, and the Time stamp index is selected as a largest integer smaller than the value [Page offset*n/Maximum number of logical pages that can be stored in block].

9. The method of claim 8, wherein the approximate time stamp is determined by the following equation:

$$\text{Approximate time stamp} = \text{Time stamp of block in consideration of time stamp index} + ((\text{Page offset of logical page}) \% (\text{Maximum number of logical pages that can be stored in block}/n)) * k,$$

where the value ((Page of logical page) % (Maximum number of logical pages that can be stored in block/n)) is a remainder when the value (Page offset of logical page) is divided by the value (Maximum number of logical pages that can be stored in block/n), and where $k \geq 0$ and k is a real number.

10. The method of claim 1, wherein the time stamp is a sequence number of the logical page provided to the storage device from the host.

11. The method of claim 1, wherein the storage device includes a non-volatile memory device.

12. A memory system, comprising:
a nonvolatile memory device comprising a plurality of blocks, each of which blocks includes a plurality of logical pages; and
a controller connected to the nonvolatile memory device, wherein the controller is configured to access the nonvolatile memory device in response to a request from a host,
wherein the memory system is configured to receive a logical page from the host and in response thereto to determine whether the received logical page is in a first state or in a second state different from the first state, wherein when the logical page is in the first state this indicates that the logical page is more frequently updated than when the logical page is in the second state,
wherein determining whether the logical page is in the first state or in the second state comprises:
finding a block of the storage device in which the logical page is stored and detecting a time stamp of the block and a page offset of the logical page stored in the block,
calculating an approximate time stamp of the logical page stored in the block by using the time stamp of the block and the page offset,
determining that the logical page is in the first state if a difference between the actual time stamp and the approximate time stamp is smaller than a threshold value, and
determining that the logical page is in a second state different from the first state if the difference between the actual time stamp and the approximate time stamp is larger than the threshold value, and
wherein a number of time stamps stored in the block is less than a number of the plurality of logical pages in the block.

13. The memory system of claim 12, wherein the approximate time stamp is calculated by the following equation:

Approximate time stamp=Time stamp of block+Page offset of logical page*$k$, where $k \geq 0$ and where k is a real number.

14. The memory system of claim 12, wherein only one time stamp is stored in the block.

15. The memory system of claim 12, wherein more than one time stamp is stored in the block.

* * * * *